(12) United States Patent
Hwang

(10) Patent No.: US 8,833,404 B2
(45) Date of Patent: Sep. 16, 2014

(54) WINDABLE STEEL NET REINFORCEMENT STRUCTURE

(76) Inventor: Yong Ki Hwang, Incheon (KR)

( * ) Notice: Subject to any disclaimer, the term of this patent is extended or adjusted under 35 U.S.C. 154(b) by 111 days.

(21) Appl. No.: 13/139,230

(22) PCT Filed: Dec. 14, 2009

(86) PCT No.: PCT/KR2009/007471
§ 371 (c)(1),
(2), (4) Date: Jun. 10, 2011

(87) PCT Pub. No.: WO2010/074445
PCT Pub. Date: Jul. 1, 2010

(65) Prior Publication Data
US 2011/0240167 A1    Oct. 6, 2011

(30) Foreign Application Priority Data
Dec. 24, 2008    (KR) .................. 10-2008-0133391

(51) Int. Cl.
| | |
|---|---|
| *E04H 17/02* | (2006.01) |
| *E04H 17/14* | (2006.01) |
| *B65G 15/48* | (2006.01) |
| *B65G 35/04* | (2006.01) |
| *E06B 9/18* | (2006.01) |

(52) U.S. Cl.
CPC ............. *B65G 15/48* (2013.01); *B65G 35/04* (2013.01); *E06B 9/18* (2013.01)
USPC ............................................... 140/5; 256/32

(58) Field of Classification Search
CPC .......... E06B 9/18; B65G 15/48; B65G 35/04; B21F 27/00; B21F 27/08; B21F 27/12; B21F 27/121; B21F 29/00; B21F 31/00
USPC ............... 140/5, 10, 11, 13, 25, 12; 245/5, 6; 256/34, 35, 42, 43, 45, 46, 47, 51, 54, 256/24, 32
See application file for complete search history.

(56) References Cited

U.S. PATENT DOCUMENTS

| | | | | | |
|---|---|---|---|---|---|
| 259,989 | A | * | 6/1882 | Pickhardt | 245/6 |
| 520,906 | A | * | 6/1894 | Tourasse | 245/6 |
| 2,127,358 | A | * | 8/1938 | Guba | 245/6 |
| 3,376,002 | A | * | 4/1968 | Andrews et al. | 245/6 |
| 4,098,493 | A | * | 7/1978 | Logan | 256/24 |
| 4,492,364 | A | * | 1/1985 | Boyanton | 256/47 |
| 6,176,471 | B1 | * | 1/2001 | Naegele et al. | 256/47 |

(Continued)

FOREIGN PATENT DOCUMENTS

| | | | |
|---|---|---|---|
| GB | 2230280 A | * | 10/1990 |
| JP | 08-332543 A | | 12/1996 |

(Continued)

*Primary Examiner* — Teresa M Ekiert
(74) *Attorney, Agent, or Firm* — John K. Park; Park Law Firm

(57) ABSTRACT

The present invention relates to a steel net reinforcement structure which is used for a conveyer belt or a shutter screen. The steel net reinforcement structure comprises: a steel net including hooks projecting from both sides thereof; a reinforcement including a slit cut open along a diagonal direction on both sides thereof; and a steel core which can lock the hooks which are inserted on both inner sides of the reinforcement. The steel net reinforcement structure can be wound conveniently and flexibly while reinforcing strength of the steel net.

2 Claims, 5 Drawing Sheets

(56) References Cited

U.S. PATENT DOCUMENTS

| | | | |
|---|---|---|---|
| 6,279,858 B1 * | 8/2001 | Eicher | 256/47 |
| 2006/0075699 A1 * | 4/2006 | Messick et al. | 52/202 |
| 2007/0144101 A1 * | 6/2007 | Costello | 52/633 |

FOREIGN PATENT DOCUMENTS

| | | |
|---|---|---|
| JP | 2001-219235 A | 8/2001 |
| JP | 2003-071535 A | 3/2003 |
| WO | 2005-023453 A1 | 3/2005 |

* cited by examiner

WINDABLE STEEL NET REINFORCEMENT STRUCTURE

TECHNICAL FIELD

The present invention relates, in general, to a windable steel net reinforcement structure and, more particularly, to a steel net reinforcement structure that reinforces the strength of a steel net, thus preventing the steel net from sagging or being damaged by external force, therefore allowing the steel net to be smoothly wound.

BACKGROUND ART

Generally, a steel net is made by weaving wire in the form of a net, and is used for a fence, an anti-crime window, a filter net, and other purposes. As the width of the steel net increases, the central portion of the steel net may easily sag or stretch. Hence, the steel net must be cut to a predetermined width according to the usage purpose.

Meanwhile, a conventional steel net is formed using wire. If the steel net is installed to a large area or with long length, strength is reduced at the central portion of the steel net. That is, since only the steel net itself bears external force, its strength is low and the steel net is frequently stretched or damaged by external force. For example, when the steel net is used for a fence, the steel net is spread and installed between two pillars. Here, if external force acts on a portion between the pillars, the wire forming the steel net is frequently stretched or broken.

Therefore, an increase in strength of the wire cannot perfectly solve the above problems, so that an additional reinforcing structure is required. As an example of a structure that has been widely used, there is a method of increasing the strength of the steel net by installing additional wire or metallic bars in a horizontal direction.

However, the reinforcing structure is problematic in that it is formed separately from the steel net, so that it is impossible to obtain a sufficient reinforcing effect in addition to making construction difficult.

Moreover, the above reinforcing structure is problematic in that it is restrictively applied to a steel net for a fence, so that it may not be applied to various other purposes. Therefore, it is necessary to solve these problems.

DISCLOSURE

Technical Problem

Accordingly, an object of the present invention is to provide a steel net reinforcement structure that reinforces the strength of a steel net, thus allowing the steel net to be firmly installed and be windable, therefore being widely used for a device that requires winding, for example, a shutter door or a conveyor belt, as well as for a general fence.

Technical Solution

In order to accomplish the above object, the present invention provides a windable steel net reinforcement structure, including a steel net made by weaving wire in a form of a net in such a way that loops of meshes protrude from both ends thereof; a reinforcement formed to have a shape of a pipe, and having slits that are cut in a shape of comb teeth on both sides of the reinforcement so that the respective loops of the steel net are fitted into the slits; and steel cores fitted into both sides of the reinforcement and formed to lock the loops of the steel net fitted through the respective slits.

Further, the steel net may be formed by parallel weaving at least two net units that are integrally woven long in such a way that the loops protrude from ends thereof, the net units being woven with each other in such a way as to rotate forwards and backwards.

Further, the reinforcement may be formed in a shape of a pipe that is pressed thin, with the slits being formed in both ends of the pressed pipe. The steel cores may be secured to the reinforcement so as not to be removed from the reinforcement.

Advantageous Effects

The present invention is advantageous in that a steel net cut to a predetermined width is connected to a reinforcement, thus preventing the steel net from sagging or being damaged, and the steel net and the reinforcement are flexibly wound while rotating forwards and backwards, thus being utilized for various purposes including a device that requires winding, such as a conveyor belt or a shutter screen. Further, the present invention is advantageous in that the steel net and the reinforcement are smoothly rotated forwards and backwards but are prevented from moving leftwards and rightwards, thus achieving more reliable use.

DESCRIPTION OF REFERENCE CHARACTERS OF IMPORTANT PARTS

Figure 1:
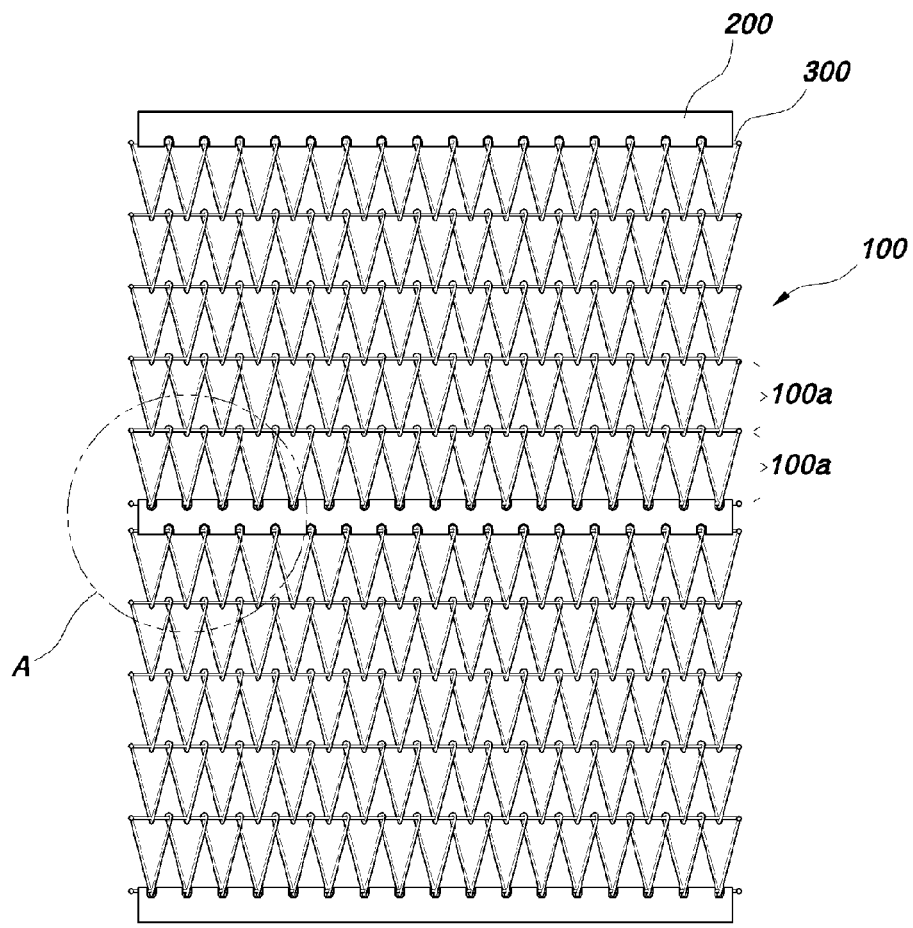
FIG. 1 is a front view showing a windable steel net reinforcement structure according to the present invention.

100: steel net
100a: net unit
110: loop
200: reinforcement
210: slit
300: steel core Mode for Invention The preferred embodiments of the present invention will be described in detail with reference to the accompanying drawings.

Figure 2:
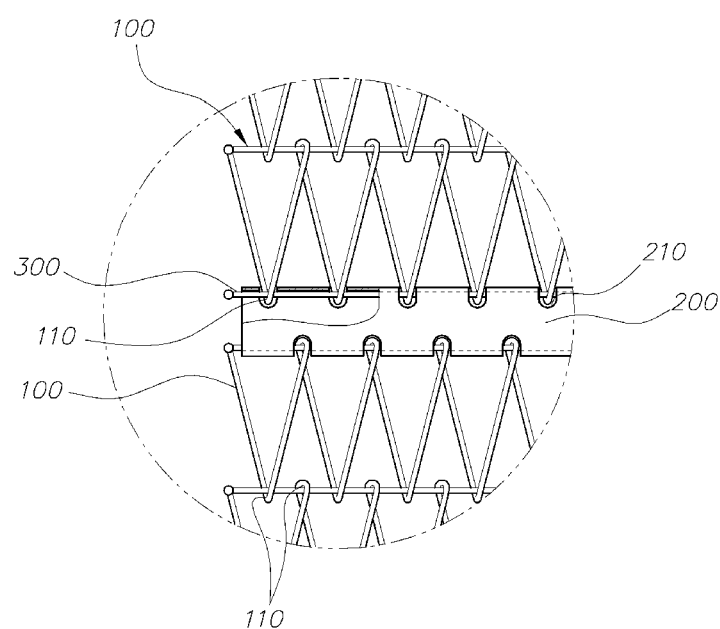
FIG. 2 is an enlarged view showing a portion "A" encircled in the windable steel net reinforcement structure according to the present invention.
Figure 3:
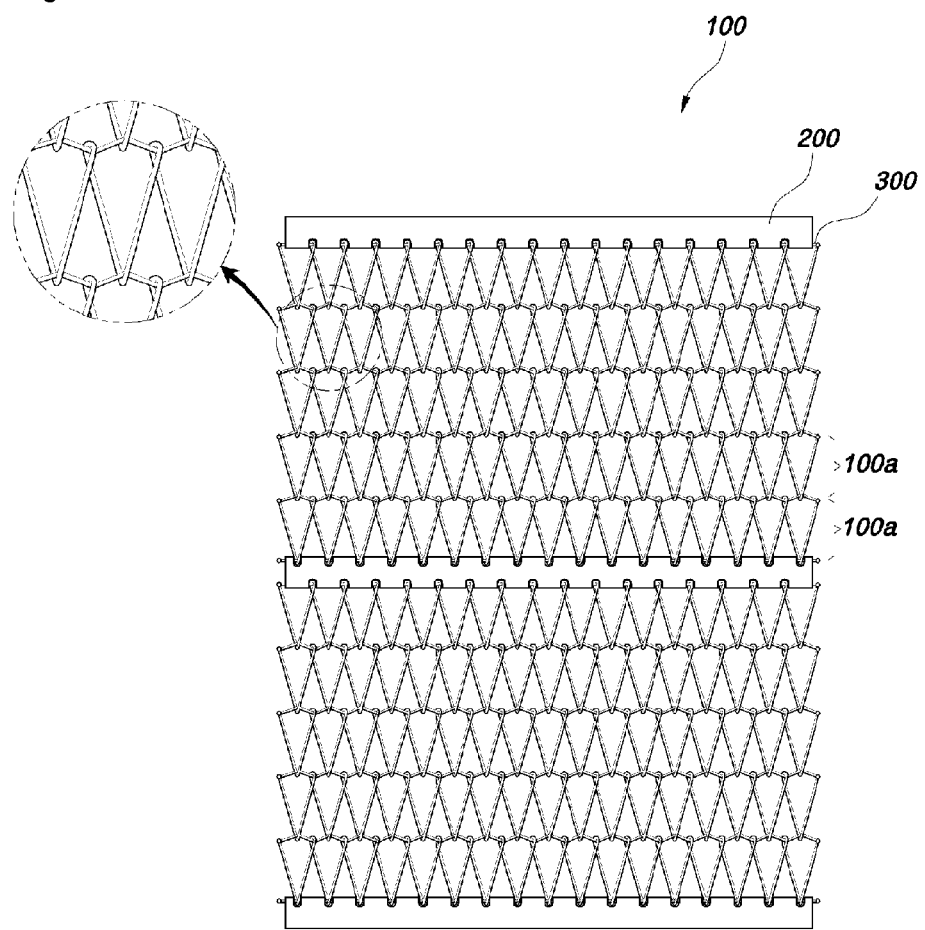
FIG. 3 is a view illustrating a steel net according to another embodiment of the present invention.
Figure 4:
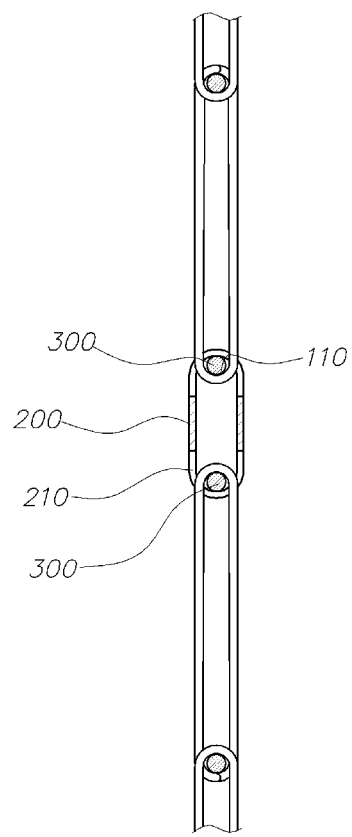
FIG. 4 is an enlarged sectional view showing the portion "A" encircled in the windable steel net reinforcement structure according to the present invention.
Figure 5:
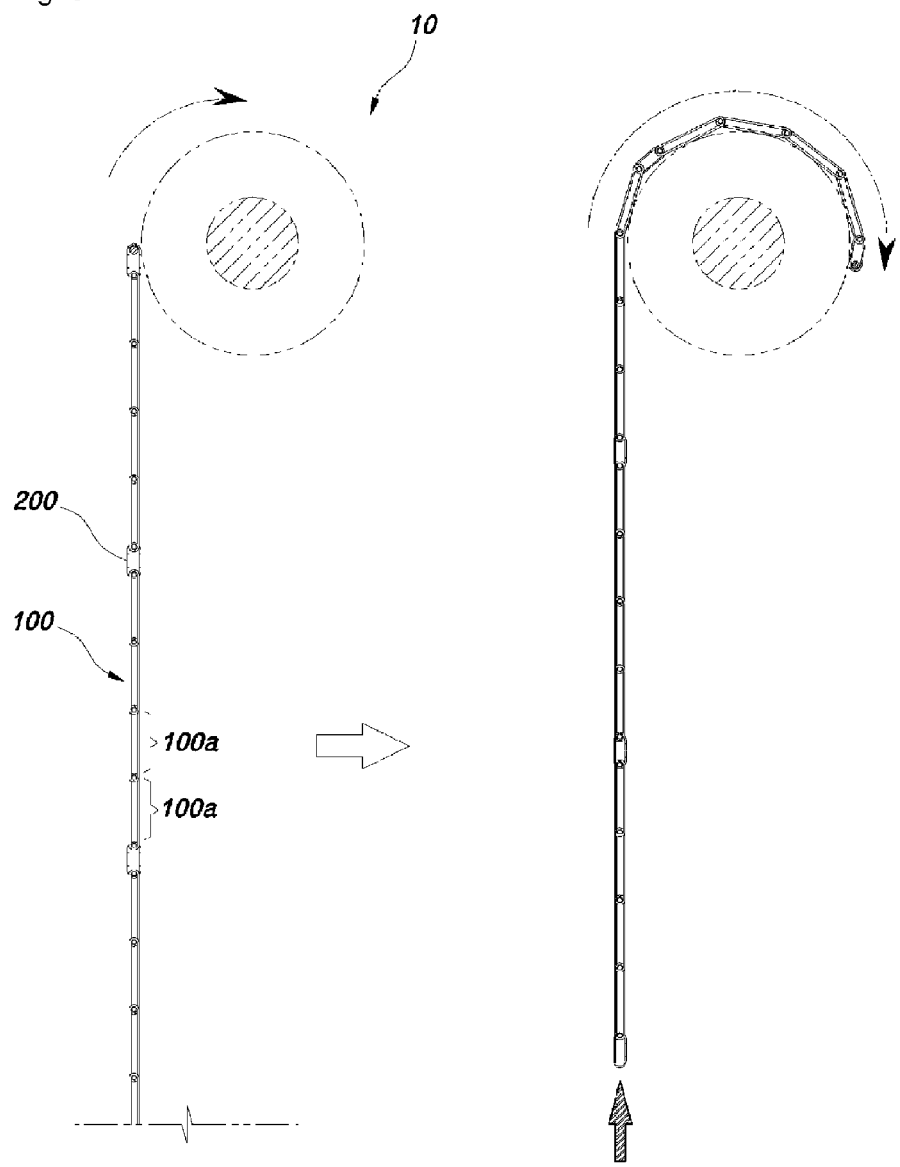
FIG. 5 is a view showing the use of a windable steel net reinforcement structure according to an embodiment of the present invention.
Figure 6:
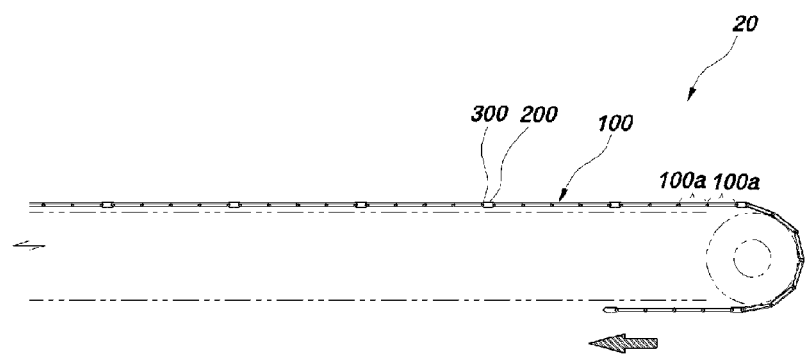
FIG. 6 is a view showing the use of a windable steel net reinforcement structure according to another embodiment of the present invention.

FIG. 1 is a front view showing a windable steel net reinforcement structure according to the present invention, FIG. 2 is an enlarged view showing a portion "A" encircled in the windable steel net reinforcement structure according to the present invention, FIG. 3 is a view illustrating a steel net according to another embodiment of the present invention, FIG. 4 is an enlarged sectional view showing the portion "A" encircled in the windable steel net reinforcement structure according to the present invention, FIG. 5 is a view showing the use of a windable steel net reinforcement structure according to an embodiment of the present invention, and FIG. 6 is a view showing the use of a windable steel net reinforcement structure according to another embodiment of the present invention.

As shown in FIGS. 1 to 6, a windable steel net reinforcement structure according to the present invention mainly includes a steel net 100 that is woven in such a way that loops protrude from both ends thereof, a reinforcement 200 that has slits cut along both ends thereof in the shape of comb teeth, and steel cores 300 that are formed to lock the respective loops of the steel net fitted into both sides of the reinforcement.

As shown in FIGS. 1 to 6, a windable steel net reinforcement structure according to the present invention includes a steel net 100 that is woven in such a way that loops protrude from upper and lower ends thereof (upper and lower directions based on the drawings, the rest is the same as above) and are arranged along the upper and lower ends, a reinforcement 200 that has slits formed along upper and lower ends thereof in the shape of comb teeth, and steel cores 300 that are formed to lock the corresponding loops of the steel net fitted into both sides of the reinforcement.

The steel net 100 is formed by connecting unit bodies 100a, each of which has the loops 110 on upper and lower ends thereof, to each other. Each net unit 100a has a saw-toothed shape, formed by winding a wire in one direction, pressing it flat, and pulling it out in a longitudinal direction. Due to such a construction, the loops 110 are consequentially formed on the upper and lower ends of the net unit 100a.

The present invention includes at least two net units 100a which are arranged parallel to each other. Two net units 100a which are arranged parallel to each other are configured such that the loops 110 of one net unit 100a and the loops 110 of the other net unit 100a are alternately arranged on a junction between the two net units 100a. A linear wire is disposed in such a way as to pass through the alternately-arranged loops 110 in the transverse direction of the loops 110. In this way, the net units 100a are connected to each other, thus forming the steel net 100.

Here, as shown in FIG. 3, the wire which connects the net units 100a to each other may be bent in a zigzag manner, so that the loops 110 are disposed in concave portions of the wire, whereby the loops 110 can be maintained in place without being displaced to the left or the right.

As such, adjacent net units 100a are connected to each other in such a way that the loops 110 of the net units 100a are alternately arranged and the wire is disposed through the loops 110, thus forming the steel net 100. Therefore, each of the net units 100a of the steel net 100 can rotate around the wire forwards or rearwards, thereby making it possible for the steel net 100 to be wound.

If the width of the steel net 100 increases, the steel net may be stretched excessively. Thus, it is preferable that the steel net be formed to have a predetermined width. Preferably, the vertical width of each net unit 100a is reduced as much as possible so that it can be smoothly wound around a rotary body such as a roller or drum.

The reinforcement 200 is formed to have the shape of a pipe and has the slits 210 formed along the upper and lower ends thereof in a shape of comb teeth so that the loops of the steel net are inserted into the corresponding slits 210. The reinforcement 200 may have various cross-sectional shapes, including a circle, an ellipse, a diamond, etc. However, as shown in FIGS. 1 to 3, the reinforcement is preferably formed in a shape of an elliptical pipe that is pressed thin so that there is no large difference in thickness between the reinforcement and the steel net 100 when the steel net reinforcement structure is wound, with the slits 210 being formed in the upper and lower ends of the pressed reinforcement.

The steel cores 300 are fitted into both sides of the reinforcement 200, and lock the respective loops 110 of the steel net 100 fitted through the respective slits 210. The steel cores 300 comprise one pair of steel cores.

Each steel core 300 is secured to the reinforcement 200 so as not to be removed therefrom. In order to secure the steel core to the reinforcement, the steel core is preferably welded to the reinforcement. The welding prevents the steel core from being easily removed from the reinforcement.

According to the present invention constructed as described above, several steel nets 100 of a predetermined width are connected to each other by the reinforcements 200 and the steel cores 300 so as to be used for various purposes. That is, the steel net of the present invention may be installed between two pillars to form a fence. Particularly, the steel net is formed into a windable structure, so that it may be used as a screen of a shutter 10 as shown in FIG. 5, or as a belt of a conveyor 20 as shown in FIG. 6.

Here, in the case where the steel net is used for the belt of the conveyor 20, several steel nets 100 are connected to each other by the reinforcements 200 and the steel cores 300, like an endless track.

The reinforcements 200 and the steel cores 300 for connecting the steel nets 100 to each other prevent the steel nets 100 from sagging or rolling, and allow the steel nets 100 and the reinforcements 200 to be flexibly wound while rotating forwards and backwards. Thus, the present invention may be easily used as the belt of the conveyor 20 or the screen of the shutter 10.

Particularly, the loops 110 of the steel net 100 are locked to the steel core 300 while being fitted into the slits 210 of the reinforcement 200, thus allowing the steel net 100 and the reinforcement 200 to smoothly rotate forwards and backwards, in addition to preventing the steel net and the reinforcement from moving leftwards and backwards, therefore enabling more reliable use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A windable steel net reinforcement structure, comprising:
    a steel net comprising a plurality of net units arranged adjacent to each other, each of the net units being formed by winding a wire in one direction, pressing the wound wire flat, and pulling the pressed wire in a longitudinal direction such that loops are formed on upper and lower ends of the net unit, wherein the loops of the adjacent net units are alternately arranged, and a steel-core wire is disposed in the alternately-arranged loops so that the net units are connected to each other so as to form substantially triangular meshes, wherein each of the plurality of net units extends horizontally in flattened and substantially sawtooth forms and includes a plurality of lower bent portions and a plurality of upper twisted-and-bent portions, wherein the plurality of net units are arranged vertically with one net unit per a vertical layer so that each of the plurality of lower bent portions of an upper net units is disposed between two neighboring upper twisted-and-bent portions of a lower net unit, and wherein the steel-core wire is queued through the plurality of lower bent portions of the upper net units and the upper twisted-and-bent portions of the lower net unit that are aligned with each other, so as to form overlap-free triangular meshes;

a reinforcement formed to have a shape of a flattened pipe, the reinforcement having slits formed in both sides thereof to have a shape of comb teeth so that the loops of the steel net are inserted into the corresponding slits; and steel cores inserted into both sides of the reinforcement in such a way that the loops of the steel net that have been inserted into the corresponding slits are fitted over and locked to the corresponding steel cores, wherein the reinforcement is formed in a shape of a pipe that is pressed thin, with the slits being formed in upper and lower ends of the pressed pipe.

2. The windable steel net reinforcement structure according to claim 1, wherein the reinforcement and the steel cores are locked to each other to prevent the steel cores from being removed from the reinforcement.

* * * * *